United States Patent Office 2,915,553
Patented Dec. 1, 1959

2,915,553

(2,2-DIALLYL-4-PENTENOYL) UREA

Gustav Hildebrandt, deceased, late of Mannheim, Germany, by Lore Antonia Klara Hildebrandt, née Deecke, Ullrich Georg Warner Hildebrandt, and Konrad Gustav Walter Hildebrandt, heirs, all of Mannheim, Germany, assignors to Knoll A.G. Chemische Fabriken, Ludwigshafen (Rhine), Germany, a corporation of Germany No Drawing. Application May 22, 1958
Serial No. 736,973

Claims priority, application Germany May 25, 1957

1 Claim. (Cl. 260—553)

The present invention relates to a new hypnotic and antispasmodic compound and, more particularly, to triallyl acetyl urea.

It is one object of the present invention to provide triallyl acetyl urea having hypnotic as well as antispasmodic activity.

Other objects of the present invention and advantageous features thereof will become apparent as the description proceeds.

Triallyl acetyl urea has proved to be a valuable therapeutic agent. It is a highly effective, well tolerated hypnotic compound exerting its hypnotic activity over a medium range period of time and having a rather large range of therapeutic effectiveness. Furthermore, said new urea compound has an antispasmodic activity of an unusual and surprisingly wide activity range. When administered in doses which are far below the doses required for causing sleep, it has a protective effect against spasms caused by the injection of cardiazol, lethal doses of nicotine and strychnine, and spasms caused by electroshock. Furthermore, triallyl acetyl urea has a fright suppressing effect when used in very small doses whereby neither the power of motility is affected nor any hypnotic effect is produced.

Triallyl acetyl urea of the formula

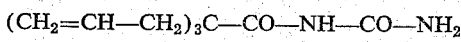

$(CH_2=CH-CH_2)_3C-CO-NH-CO-NH_2$ can be prepared by the following processes:

(1) A triallyl acetic acid halogenide or ester, if necessary, in the presence of a condensing agent, or triallyl acetic acid itself in the presence of a dehydrating agent, is reacted with urea or a compound readily convertible into urea.

Such compounds which, after condensation with the triallyl acetic acid derivative, yield the urea compound by treatment with ammonia, by hydrolysis, or by treatment with phosphorus pentachloride and subsequent reaction with ammonia, are, for instance, urethanes, guanidine, isourea ethers, cyanamide, and isocyanic acid, and its salts. In place of urea, thiourea may also be used whereby the sulfur of the resulting triallyl acetyl thiourea is replaced by oxygen in a known manner.

(2) Triallyl acetamide is reacted with carbamic acid halogenides, isocyanic acid, or isocyanic acid esters. Triallyl acetamide may also be reacted with oxalyl chloride. The resulting bis-urea compound is then hydrolyzed. Or triallyl acetamide is reacted with carbonic acid esters or phosgene and the resulting compounds are then subjected to the action of ammonia.

(3) Triallyl acetonitrile is reacted with urea, if necessary in the presence of a catalyst, and the resulting amidine compound is hydrolyzed or the nitrile is reacted with guanidine and the resulting diimino compound is hydrolyzed. In place of urea, thiourea may also be used whereby the sulfur of the resulting triallyl acetyl thiourea is replaced by oxygen in a known manner.

The following examples serve to illustrate the present invention without, however, limiting the same thereto.

*Example 1*

398 g. (2 mols) of triallyl acetyl chloride, obtained by alkaline hydrolysis of triallyl acetonitrile and reaction of the resulting triallyl acetic acid with thionyl chloride, are stirred with 360 g. (6 mols) of dry urea at a temperature of 80–90° C. for 11 hours. Thereby, the reaction mixture is gradually converted into a highly viscous product. After the reaction is completed, the mixture is poured into 1.5 l. of hot water. The mixture is stirred for 20 minutes while heated on a water bath at about 90° C., and is cooled to room temperature while stirring is continued. Thereby, the desired triallyl acetyl urea crystallizes. The crystals are filtered with suction, washed with cold water, and dried. After recrystallization from aqueous methanol, 350 g. of pure triallyl acetyl urea melting at 86° C. are obtained. Another crop of 20 g. is obtained when working up the mother liquor. The total yield is 83–84% of the theoretical amount.

*Example 2*

44 g. of triallyl acetylbromide (⅕ mol), prepared by reacting triallyl acetic acid with phosphorus pentabromide, are stirred with 30 g. of urea (2½ mols) at 105° C. for 2 hours. The resulting product is triturated with water at room temperature and the formed crystals are filtered with suction. The crude compound is purified by dissolving it in benzene, evaporating the dried benzene solution, and recrystallizing the residue from hexane and then from a mixture of alcohol and hexane (1:5). The yield is 22 g. corresponding to 50% of the theoretical amount. Melting point: 86° C.

As stated hereinabove, triallyl acetyl urea has valuable properties as therapeutic agent. Pharmacological tests have shown that 187 mg./kg. administered perorally to rats cause sleep in 50% of the tested animals. The $LD_{50}$ with rats is 490 mg./kg. (per os). 26.9 mg./kg., perorally administered, is the protective dose against spasms caused by the injection of cardiazole in 50% of the animals. 55.0 mg/kg. given orally, represents the protective dose against lethal doses of strychnine in 50% of the animals. 18.7 mg./kg. given orally represents the protective dose against lethal doses of nicotine in 50% of the animals. When treating mice with 100 mg./kg. perorally, the lethal dose of cardiazole can be increased from 32.5 mg./kg. (intravenously) to 135.0 mg./kg. (intravenously). The dose for inhibiting the effect of an electroshock treatment in mice, i.e., the dose which permits to increase the current intensity by 100% to cause electroshock, is 80 mg./kg. given orally.

Triallyl acetyl urea according to the present invention is quite harmless and does not produce any adverse effects. The chronic toxicity is low. Oral administration of 50 mg./kg. each second day to rabbits for 5 weeks shows that the blood picture remains unchanged. No effect on thrombocytes could be observed. The liver function tested by means of bromsulfalein (phenol tetrabromphthalein sodium sulfonate) was also unchanged. Furthermore, the urine of the treated animals was tested for urobilinogen, porphyrin, sediments, and proteins. The tests were negative.

The therapeutically effective dose in human medicine is between about 100 mg. and about 400 mg. per single dose.

Triallyl acetyl urea is preferably administered perorally in the form of tablets or dragees or rectally in the form of suppositories.

When preparing tablets, pills, suppositories and the like preparations to be used in human therapy, commonly used diluting agents, binders, lubricants, and other tableting adjuvants are employed, such as sugar, lactose, talc, starch, bolus alba, pectin, as binder gelatin, gum arabic, methyl cellulose, yeast extract, agar, tragacanth, and as lubricants stearic acid, magnesium stearate, and others. The content of the active compound in such preparations may vary. It is, of course, necessary that the active compound be present in such an amount that a suitable dosage will be ensured. Ordinarily the preparation should not contain less than 10% of the active compound. The preferred amount of active compound is between 20% and 40% of the preparation.

The following examples of compositions containing triallyl acetyl urea according to the present invention as they are used in therapy serve to illustrate the present invention without, however, limiting the same thereto.

Example 3

2000 g. of triallyl acetyl urea are moistened and intimately mixed with 1750 cc. of a 2% gelatin solution. The resulting mixture is granulated and dried in an air current at about 40° C. The granulate is intimately mixed in a mixing device with 1800 g. of corn starch and 100 g. of magnesium stearate and compressed by means of a revolving tableting press to tablets having a weight of about 400 mg. Each tablet contains about 200 mg. of triallyl acetyl urea.

Example 4

Finely pulverized triallyl acetyl urea is intimately mixed with a molten suppository vehicle of a fatty ester or a polyethylene glycol base. The mixture is poured into a suppository mold. The resulting suppositories contain about 250 mg. of triallyl acetyl urea.

Of course, other pharmaceutical compositions such as sugar coated dragees, pills, lozenges, powder capsules, suspensions in sirups, fruit juices, and the like may also be prepared according to methods conventionally used in the pharmaceutical industry.

While the hypnotic dose on oral administration in humans is between about 200 mg. and about 400 mg., a dose as low as 100 mg. and preferably a dose between about 100 mg. and about 200 mg. is sufficient to produce antispasmodic effects and to relieve tension.

What is claimed is:

Triallyl acetyl urea.

References Cited in the file of this patent

UNITED STATES PATENTS

| 1,967,388 | Ziegler | July 24, 1934 |
| 1,969,828 | Volwiler | Aug. 14, 1934 |

FOREIGN PATENTS

| 281,365 | Great Britain | Nov. 28, 1957 |

OTHER REFERENCES

Burger: Medicinal Chemistry, vol. I (1951), Interscience Publishers, Inc., New York, pp. 131–132.